US012780009B2

(12) United States Patent
Palermo et al.

(10) Patent No.: US 12,780,009 B2
(45) Date of Patent: Nov. 3, 2026

(54) CONTROL METHOD FOR AN ELECTRIC ROAD VEHICLE AND RELATED ROAD VEHICLE

(71) Applicant: FERRARI S.P.A., Modena (IT)

(72) Inventors: Antonio Palermo, Modena (IT); Jacopo Canestri, Modena (IT); Stefano Varisco, Modena (IT)

(73) Assignee: FERRARI S.P.A., Modena (IT)

(*) Notice: Subject to any disclaimer, the term of this patent is extended or adjusted under 35 U.S.C. 154(b) by 0 days.

(21) Appl. No.: 18/882,088

(22) Filed: Sep. 11, 2024

(65) Prior Publication Data

US 2025/0083535 A1 Mar. 13, 2025

(30) Foreign Application Priority Data

Sep. 11, 2023 (IT) ........................ 102023000018558

(51) Int. Cl.
*B60L 15/20* (2006.01)
*G07C 5/08* (2006.01)
*G10K 15/02* (2006.01)

(52) U.S. Cl.
CPC ............ *B60L 15/20* (2013.01); *G07C 5/0825* (2013.01); *G10K 15/02* (2013.01); *B60L 2240/12* (2013.01); *B60L 2240/421* (2013.01); *B60L 2240/423* (2013.01); *B60L 2240/461* (2013.01); *B60L 2240/463* (2013.01); *B60L 2250/00* (2013.01)

(58) Field of Classification Search
CPC ................. B60L 15/20; B60L 2240/12; B60L 2240/421; B60L 2240/423; B60L 2240/461; B60L 2240/463; B60L 2250/00; G07C 5/0825; G10K 15/02
See application file for complete search history.

(56) References Cited

U.S. PATENT DOCUMENTS

| | | | | |
|---|---|---|---|---|
| 7,424,924 | B2 * | 9/2008 | Janson | B60K 6/365 475/5 |
| 9,321,449 | B2 * | 4/2016 | Johansson | F16H 59/44 |
| 9,651,120 | B2 * | 5/2017 | Morrow | F16H 3/727 |
| 2014/0200777 | A1 | 7/2014 | Dufford | |
| 2021/0387530 | A1 | 12/2021 | Oh et al. | |
| 2022/0041067 | A1 | 2/2022 | Isami et al. | |

FOREIGN PATENT DOCUMENTS

JP 2021151168 A 9/2021

OTHER PUBLICATIONS

Italian Search Report for Application No. 102023000018558 ; Filing Date: Sep. 11, 2023; Date of Mailing: Mar. 6, 2024; 9 pages.

* cited by examiner

*Primary Examiner* — Gertrude Arthur Jeanglaude
(74) *Attorney, Agent, or Firm* — CANTOR COLBURN LLP

(57) ABSTRACT

Control method for an electric road vehicle comprising the steps of: defining a plurality of virtual gears, each of which determines a respective torque limit profile deliverable by the power train system to the wheels as the velocity varies; detecting, upon actuation of an interface system by the driver, while driving, a selection for one of the virtual gears currently set by the driver; and delivering a drive torque to the at least two wheels as a function of said selection; wherein at least one profile of the plurality of virtual gear profiles comprises an angular point at which, as the velocity of the road vehicle increases, the torque delivered to the wheels is at least partially cut off.

15 Claims, 4 Drawing Sheets

CONTROL METHOD FOR AN ELECTRIC ROAD VEHICLE AND RELATED ROAD VEHICLE

CROSS-REFERENCE TO RELATED APPLICATIONS

This patent application claims priority from Italian patent application no. 102023000018558 filed on Sep. 11, 2023, the entire disclosure of which is incorporated herein by reference.

FIELD OF THE ART

The present invention relates to a control method for an electric road vehicle driven by a driver and a related road vehicle.

In particular, the present invention finds advantageous, but not exclusive application in the control of a high-performance road vehicle, configured to perform track laps, to which the following description will make explicit reference without thereby losing in generality.

PRIOR ART

Historically, in the technological evolution with the motor vehicle as the protagonist, it became necessary to introduce a gear (or speed) shifting system to overcome the mechanical limits imposed by the internal combustion (endothermic) engine, which, in the absence of the gear shifting system, could not cover an adequate speed range.

In particular, therefore, a gear shifting device is used which allows the transmission ratio to be varied to generally allow the multiplication of the torque delivered by the endothermic engine and to adapt the rotation speed of the latter to that of the wheels (so that high power can be available even at rather low forward speeds and high speeds can be reached).

This device in the vast majority of the cars is still the mechanically operated gearbox, which allows the pilot to be able to choose depending on the conditions of use of the vehicle between different ratios, i.e. between different gears (the number of gears varies based on the model of the vehicle).

Over the decades, starting from the need for the presence of a gear shifting system dictated by the limits of the endothermic engine, the opportunity arose to create numerous types of gear shifting systems, in particular increasingly high-performance ones (e.g. the well-known dual-clutch gearbox). In this way, the gear shifting system has become a distinguishing feature among motor vehicle manufacturers and, as previously mentioned, a tool for involving the pilot while driving the road vehicle.

In recent times, with the spread of the electric power train systems, we are moving away from the endothermic engine and at least one electric motor is thus being introduced, which solves the need for a gear shift as it is perfectly capable of quickly providing the necessary torque and of going from zero speed to maximum speed without any transmission problem.

Although the electric power train systems tendentially allow to improve performance, as they are always able to take advantage of the maximum acceleration available for a given speed, the pilot's involvement in making certain choices is reduced, such as which gear to use when entering a curve, or the feeling of detachment given by the torque pick-up when upshifting during acceleration or downshifting during deceleration, thereby reducing driving pleasure, especially in the case of high-performance sports vehicles.

Document US2021387530 discloses a control method for an electric vehicle. The method includes generating a virtual sensation of gear shifting of an electric vehicle.

Document US2022041067 discloses a controller of an electric vehicle is configured to control the torque of the electric motor using based on an accelerator pedal, a pseudo-clutch pedal, and a position of a pseudo-shift.

Document JP2021151168 discloses a virtual gear control device that allows the driver to arbitrarily change the settings of a plurality of virtual gear modes in an electric vehicle.

Aim of the present invention is to realise a control method for an electric road vehicle driven by a driver and a related road vehicle, which are at least partially free from the drawbacks described above and, at the same time, are simple and inexpensive to realise.

SUMMARY

In accordance with the present invention, there are provided a control method for an electric road vehicle driven by a driver and a related road vehicle as claimed in the following independent claims and, preferably, in any one of the claims directly or indirectly dependent on the independent claims.

The claims describe preferred embodiments of the present invention forming an integral part of the present disclosure.

BRIEF DESCRIPTION OF THE DRAWINGS

The present invention will now be described with reference to the enclosed drawings, showing some non-limiting embodiments thereof, wherein.

PREFERRED EMBODIMENTS OF THE INVENTION

With reference to the attached figures, 1 denotes as a whole a road vehicle in accordance with non-limiting embodiments of the present invention.

The same numbers and the same reference letters in the figures identify the same elements or components with the same function.

In the context of this disclosure, the term "second" component does not imply the presence of a "first" component. These terms are in fact used as labels to improve clarity and should not be understood in a limiting way.

The elements and features shown in the various preferred embodiments, including the drawings, may be combined with each other without thereby departing from the scope of protection of the present application as described below.

It should be noted that in the remainder of this description, expressions such as "above", "below", "front", "rear" and the like are used with reference to conditions of normal forward moving of the road vehicle 1 along the normal forward direction D.

Figure 1:
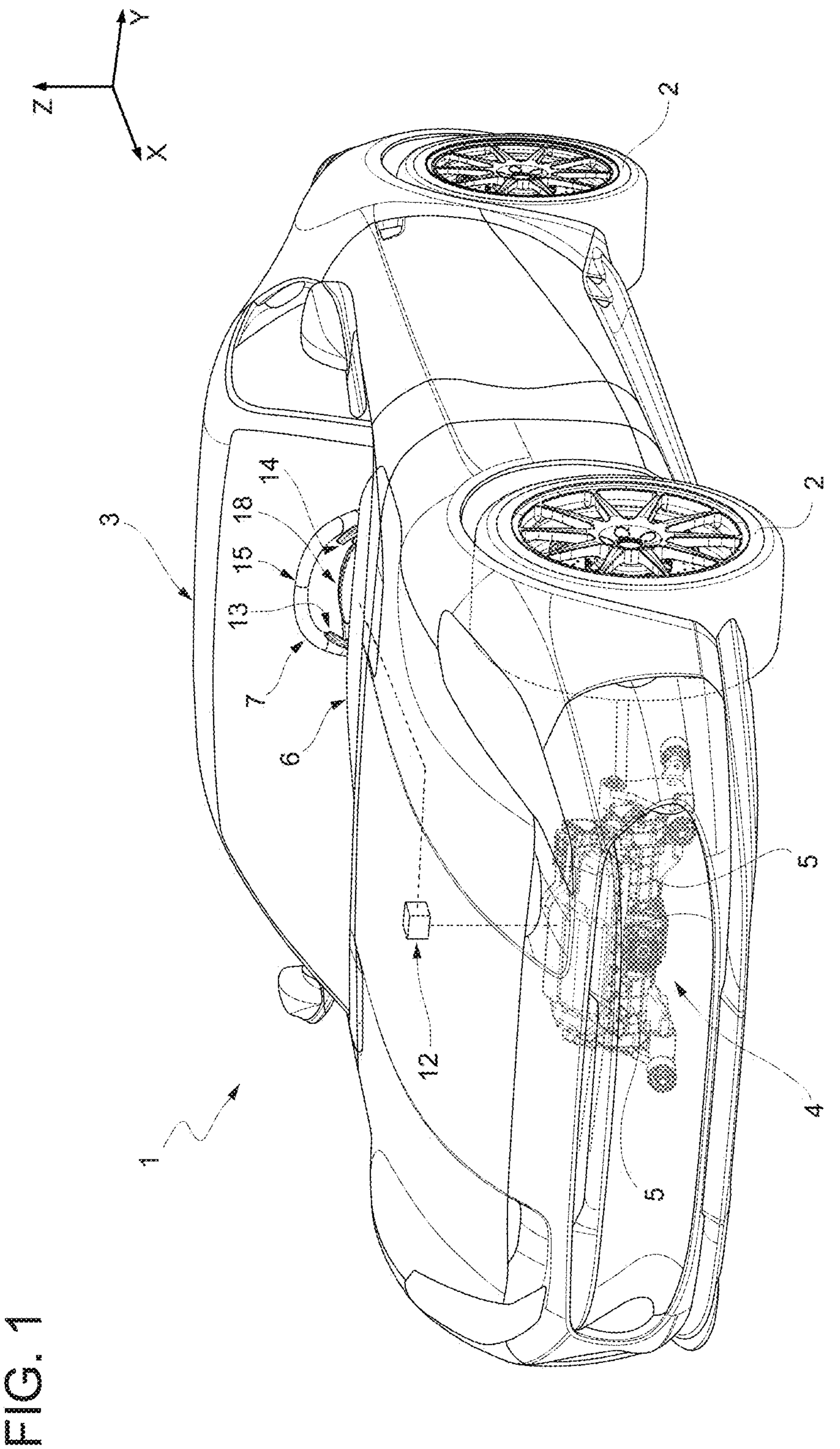
FIG. 1 is a perspective and schematic view of a road vehicle in accordance with the present invention and provided with an electric power train system.

As shown in the non-limiting embodiment of FIG. 1, it is also possible to define:

a longitudinal axis X, integral with the vehicle 1 and arranged, in use, horizontal and parallel to a normal forward direction D of the vehicle 1;

a transverse axis Y, integral with the vehicle 1 and arranged, in use, horizontal and orthogonal to the axis X; and a vertical axis Z, integral with the vehicle 1 and arranged, in use, vertical and orthogonal to the axes X, Y.

In particular, the road vehicle 1 is provided with two front wheels 2 and two rear wheels 2 of which at least one pair are drive wheels.

Figure 2:
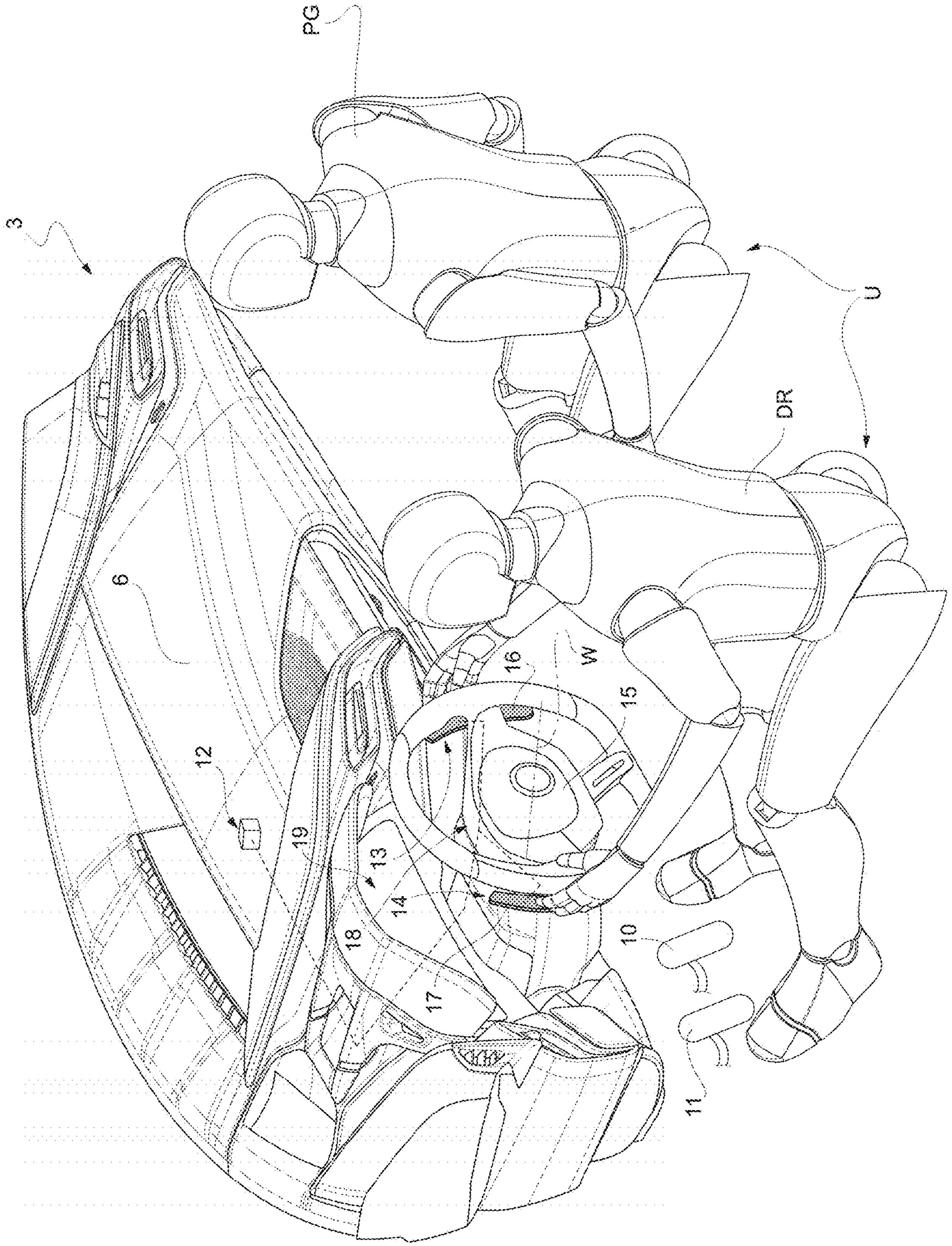
FIG. 2 is a perspective view, with details removed for the sake of clarity, of part of the interior of the road vehicle of FIG. 1.

The vehicle 1 is provided with a passenger compartment 3 which is adapted to house one or more users U, such as the driver DR and one or more passengers PG as shown in FIG. 2.

In the non-limiting embodiment of FIG. 1, the vehicle 1 comprises an electric power train system 4 non comprising a mechanical gear/speed change mechanism along the transmission and configured to deliver drive torque to the at least two drive wheels 2, in particular arranged at the front axle of the road vehicle 1 (i.e. the vehicle has a front-wheel drive).

In other non-limiting and not shown embodiments, the power train system 4 is arranged at a rear axle (i.e. the vehicle has rear-wheel drive).

In further non-limiting and not shown embodiments, the power train system 4 is arranged at both of the aforementioned axles (i.e. the vehicle has all-wheel-drive).

In particular, each single-axle drive can be defined by a single electric motor 5, optionally coupled to a differential, or by a pair 5 of electric motors.

In particular, in the case of an all-wheel drive, it may comprise two electric motors 5 (one front and one rear), three electric motors 5 or one electric motor 5 for each wheel 2 of the road vehicle 1.

The vehicle 1 also comprises a vehicular dashboard 6, which is arranged in front of the driver DR and any passenger PG and is of a known type and therefore not further detailed below.

Advantageously, moreover, the vehicle 1 comprises an interface system 7, which is configured to allow the driver DR to select a virtual gear G from a plurality of virtual gears 8. In particular, each virtual gear 8 determines a torque T limit profile A, B, C, D, E, F that can be delivered by the power train system 4 to the wheels 2 as the velocity of the road vehicle 1 along the normal forward direction varies.

Figure 3:
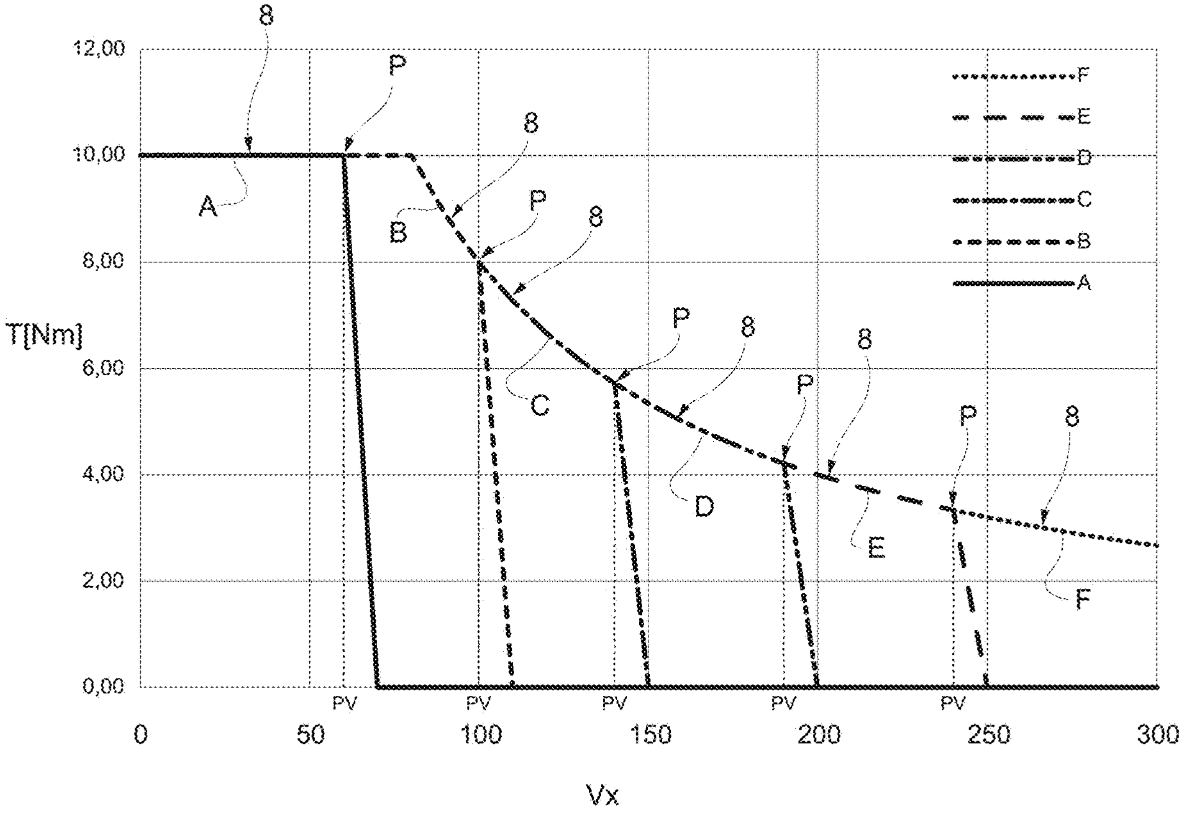
FIG. 3 is a graph showing the change in acceleration or torque as the longitudinal speed of the vehicle of FIG. 1 changes.
Figure 4:
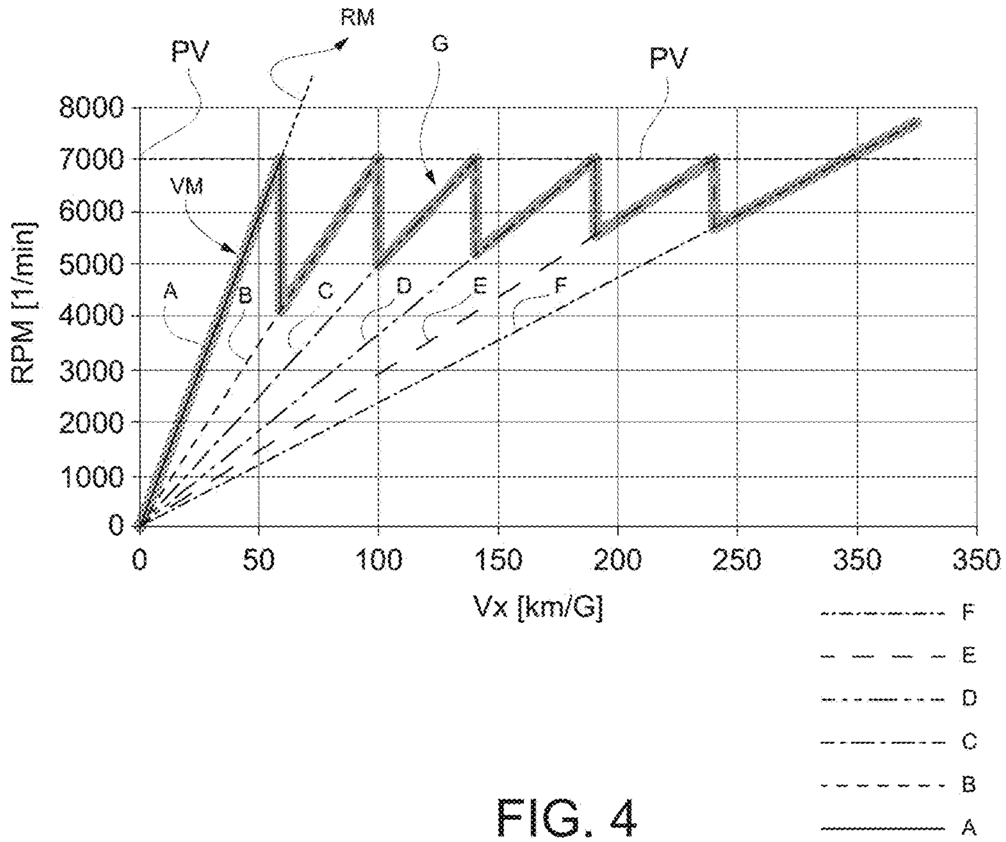
FIG. 4 is a graph showing the real and virtual RPM profiles for a first non-limiting embodiment of the present invention.
Figure 5:
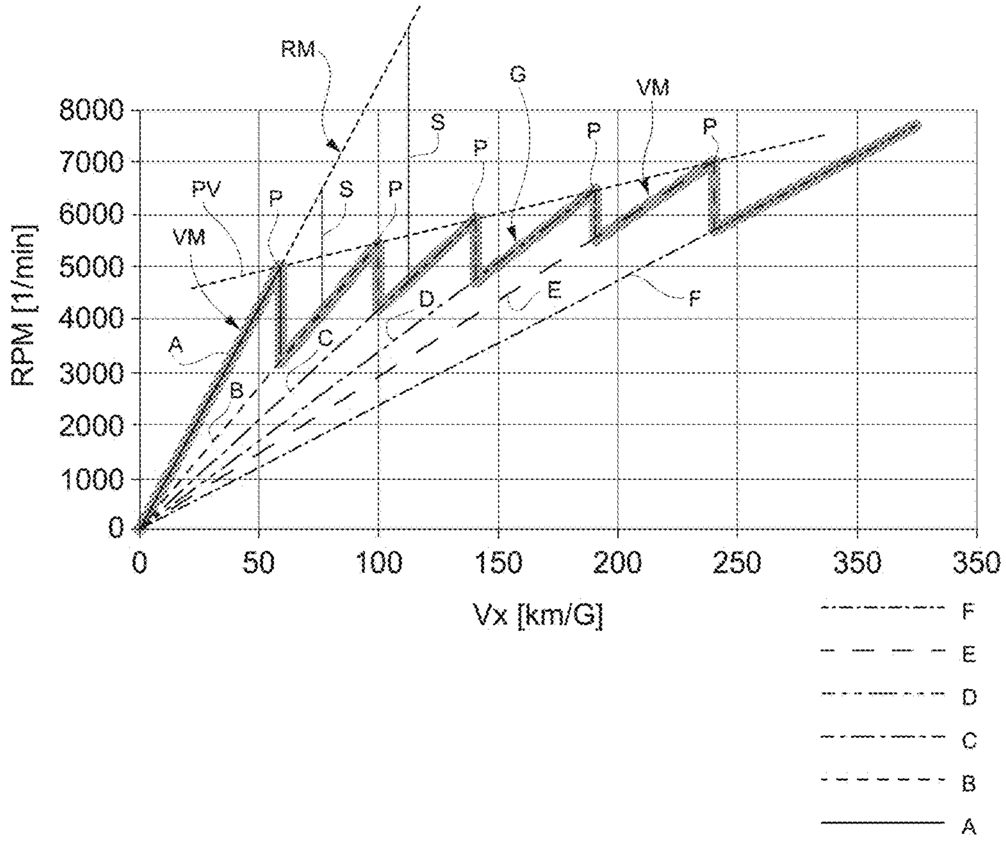
FIG. 5 is a graph showing the real and virtual RPM profiles for a second non-limiting embodiment of the present invention.

Examples of plurality with six virtual gears are shown in the non-limiting embodiments of FIGS. 3 to 5, but obviously the same concepts apply to lower or higher numbers of virtual gears, for example eight.

In detail, the word "virtual gears", taking into account that the electric power train system 4 does not require a mechanical gearbox, as in the case of conventional internal combustion engines, means the imposition of an upper limit on the longitudinal acceleration Ax (positive) and, consequently, on the tractive power (i.e. on the torque) delivered to the wheels 2 of the road vehicle 1.

Preferably, but not in a limiting manner, the configurations of the embodiments shown in FIGS. 3 to 5 refer to a thrust, i.e. acceleration, configuration, in which the only pedal operated by the driver DR is an accelerator pedal 10, in particular fully. In other words, a brake pedal 11 usually present alongside the pedal 10, as shown in FIG. 2, is not used during the thrust configuration.

As shown in the non-limiting embodiment of FIG. 3, each virtual gear 8 determines a respective longitudinal acceleration Ax limit profile A, B, C, D, E, F (i.e. of the deliverable power profiles) as the longitudinal velocity Vx varies in the thrust configuration PC. Clearly, taking advantage of the characteristics of the electric power train system 4, it is possible to define infinite intermediate profiles between those mentioned above and the maximum deliverable acceleration (i.e. power).

Preferably but not in a limiting manner, the acceleration limit profiles A, B, C, D, E, F are determined empirically, for example in a manner similar to the choice of the gear calibration for the vehicles with known type gearbox and internal combustion engine.

Advantageously, the vehicle 1 comprises an electronic control unit ("ECU"—schematically shown in FIGS. 1 and 2) 12, which is configured to detect an actuation of the interface system 7 by the driver DR, while driving, the virtual gear 8 selection G.

In addition, the control unit 12 is configured to control the delivery of the drive torque to the at least two drive wheels 2 as a function of said selection G.

In addition, the control unit 12 is configured to command, as the velocity of the road vehicle 1 increases, at a respective angular point P (corner) of each respective profile A, B, C, D, E of the plurality of virtual gears 8, a cut in the torque T delivered to the wheels 2 (the profile F is devoid of such angular points P, as it is the last virtual gear 8).

For example, in the non-limiting embodiment of FIG. 3, the limit profiles A, B, C, D, E have respective angular points P respectively at 60, 100, 140, 190 and 240 km/h.

As previously mentioned, the limit profile F of the last virtual gear 8 is preferably devoid of a respective angular point P and preferably follows the profile of maximum possible acceleration of the electric motor 5 at the highest speeds.

Therefore, by means of the interface system 7, the driver DR can shift the selection G (schematically shown in FIGS. 4 and 5) at will, choosing, among the virtual gears 8, those he or she prefers in order to enter the next road stretch, for example the next curve, taking into account the torque limits imposed by the angular points P.

More in particular, each of the acceleration limit profiles A, B, C, D, E, F does not allow to cover all the longitudinal velocities Vx (from zero to maximum), without requiring the use of a speed limiter, as instead happens in known systems with gear shift and electric motorization, but, on the contrary, upon reaching predefined reference values (i.e. angular points P), for each of the 8 virtual gears (profiles A, B, C, D, E) with the exception of the last (profile F), the torque T is cut off.

Advantageously but not necessarily, the control unit 12, among other things, processes a plurality of data and regulates the behaviour of the road vehicle 1 both on a straight line and while travelling along a curve by intervening, for example, both on the torque delivered by the electric motors 5 towards the drive wheels 2, and on the management of any active suspension shock absorbers.

Physically, the control unit 12 can be composed of a single device or of several devices separated from each other and communicating through the local network (e.g. CAN, Ethernet, etc.) of the road vehicle 1.

Advantageously but not necessarily, as shown in the non-limiting embodiment of FIG. 2, the interface system 7 comprises at least one first drive device 13 operable by the driver with the right hand and at least a second drive device 14 operable by the driver with the left hand.

According to some non-limiting embodiments, one of the first drive device 13 and the second drive device 14 is configured to allow the driver DR to shift to the higher virtual gear 8 (up-shift) and the other of the first drive device 13 and the second drive device 14 is configured to allow the driver DR to shift to the lower virtual gear 8 (down-shift).

Advantageously but not necessarily, the vehicle 1 comprises a steering wheel 15, which is rotatable about a central steering axis W.

Preferably but not in a limiting manner, the first drive device 13 and the second drive device 14 are arranged respectively to the right and to the left of the central steering axis W, in particular symmetrically, in particular so as to face each other and extend radially from said central steering axis W.

In some non-limiting cases, the drive device 13 is a right paddle 16 (or right lever) and the drive device 14 is a left paddle 17 (or left lever) of a gear shift control assembly 18 of a known type and not further detailed below.

In other non-limiting and not shown cases, the drive device 13 and the drive device 14 are buttons, levers or handles.

In further non-limiting and not shown cases, the drive device 13 and the drive device 14 are different from each other and chosen from those previously indicated.

Advantageously but not necessarily, the road vehicle 1 is a high-performance sports vehicle, i.e. configured to perform laps on the track reaching speeds above 250 km/h, in particular 300 km/h.

In accordance with a further aspect of the present invention, there is provided a control method for an electric road vehicle driven by a driver DR.

The above-described road vehicle 1, in particular the control unit 12, is configured to carry out the method that will be described below.

The method comprises the step of defining the plurality of virtual gears 8, each of which determines the respective limit profiles A, B, C, D, E, F of drive torque T deliverable by the power train system 4 to the wheels 2 as the velocity Vx of the road vehicle 1 varies. In other words, therefore, the limit profiles A, B, C, D, E, F determine the longitudinal acceleration limit of the road vehicle 1 as the velocity $V_X$ varies.

Furthermore, the method comprises the step of detecting, upon actuation of the interface system 7 by the driver DR, while driving, the selection G (sequential) currently set by the driver between the virtual gears 8.

Finally, the method provides for delivering the drive torque T to the at least two drive wheels 2 according to the selection G.

In particular, at least one profile A, B, C, D, E of the plurality of virtual gear 8 profiles comprises an angular point P at which, as the velocity Vx of the road vehicle 1 increases, the torque T delivered to the wheels is at least partially cut off.

Preferably but not in a limiting manner, all limit profiles A, B, C, D, E, except for the last virtual gear 8, comprise an angular point P.

In particular, within the present description, the word "angular point" means a point of a function, in this case of the torque profile T as the velocity Vx increases (as shown in the non-limiting embodiment of FIG. 3), in which both the right and left derivatives exist, at least one is finite (in this case they are both finite), and they are different from each other. This name is due to the fact that in this case we can consider the two lines that would be obtained from the derivatives of the right and left limit, which precisely identify an angle.

In particular, each angular point P determines a virtual torque limiter per RPM of the electric motor 5.

Preferably, therefore, the virtual metric VM depends directly on the real metric RM and the driver's action on the interface system 7, i.e. on the paddles 16 and 17.

In particular, the method comprises the further step of generating a sound audible by the driver DR as a function at each angular point P. In this way, it is possible to improve driving pleasure by introducing sound dynamics similar to those of an internal combustion engine due to the presence of the mechanical gearbox. For example, such sound can be emitted by the speakers of the road vehicle 1 in a known manner and therefore not further detailed, but as a function of the limit profiles A, B, C, D, E, F.

Advantageously but not in a limiting manner, as shown in the non-limiting embodiment of FIG. 3, each angular point P is arranged, on the respective profile A, B, C, D, E, at predefined values of a speed metric RPM of the at least one electric motor 5, in particular at predefined values PV of revolutions per minute (which may, in the case of electric motors without mechanical gear shift, correspond to a speed value in km/h).

According to some non-limiting embodiments, such as the one shown in FIG. 3, the distance between two successive predefined values PV increases as the virtual gears increase. For F example, between the third and fourth predefined value PV respectively of the profiles C and D, the distance in km/h, in accordance with what has been said previously, is equal to 50, while between the second and third profiles it is equal to 40. In this way, the driver DR can perceive "pulling" the 8 gears more and more, as they grow, i.e. he or she is pressing on the accelerator pedal 10 for a longer time as the virtual gears 8 increase.

In some non-limiting cases, this distance between two successive predefined values PV continuously increases as the gears increase.

Advantageously but not in a limiting manner, the method comprises the further step of defining a virtual metric VM, in particular virtual revolutions per minute, of the speed of the at least one electric motor 5; wherein the position of each angular point P on the respective profile depends on the value of the virtual metric VM. In this way, the position of the angular P points can be defined so that the driver perceives a torque limitation directly related to the virtual VM metric, i.e., virtual RPM.

FIGS. 4 and 5 show two different embodiments obtainable starting from the graph of the embodiment of FIG. 3. In particular, in the following, we will assume that the driver DR knows the positioning of the angular points P and makes the most of the torque T by shifting, for example by interacting with the right paddle 16, whenever an angular point P is reached.

In particular, for example as shown in FIG. 4 or 5, the virtual metric VM differs at least in part from a respective real metric RM of the at least one electric motor 5, in particular wherein virtual revolutions per minute differ at least in part from real revolutions per minute of the at least one electric motor. In other words, the electric motor 5 will actually go (therefore according to the metric RM), for example, from zero to twenty thousand revolutions per minute on the same gear, while virtually (therefore according to the metric VM), upon shifting (and therefore the angular point according to what is said in the previous paragraph) virtual RPM are defined.

In the non-limiting embodiment of FIG. 4, the predefined values PV, therefore the optimal shift points, where there are the angular points P that would therefore cause a cut of the torque T, always have the same value, for example equal to 7000 RPM.

In other non-limiting cases, such as the one shown in FIG. 5, the predefined values PV, therefore the optimal shift points, where there are the angular points P that would therefore cause a cut of the torque T, have different values, in particular increasing (also in this case to give the driver DR the feeling of "pulling" the gears more as the latter increase).

Advantageously but not necessarily, the method comprises a step of projecting on a vehicular screen 19 the virtual metric VM and not the respective real metric RM. In other words, the driver DR is not provided with the real RPM that the electric motor 5 is reaching, but the downshifted value VM so as to convert the real metric RM into a more exciting value for the driver, as is currently the case with the internal combustion engines, so as to make the driver DR more involved in the performance through the gesture of shifting gear (although mechanically it does not correspond to an actual speed shift).

According to some non-limiting embodiments, the virtual metric VM varies in concordance with the respective real metric RM apart a predefined offset S for each virtual gear 8. Therefore, the virtual metric VM varies correspondingly with the real metric RM except for an offset S defined for each virtual gear 8. For example, the offset for second gear is 2000 RPM, and for third gear is 3000 RPM. In this case, in third gear the real RPM metric could be 6000 RPM, while the driver is shown the virtual metric VM equal to 3000 RPM.

In particular, in FIGS. 4 and 5 the predefined offset S is variable between virtual gears (preferably remaining constant within the same virtual gear), in particular a variable ratio between the real metric RM and the virtual metric VM that changes between one gear and another.

In other non-limiting and not shown embodiments, the virtual gears 8 have the same angular coefficient as the real metric RM and, therefore, the offset S remains constant for a same virtual gear 8.

In this case, at each angular point P, the value of the virtual metric VM decreases by the additional value of the respective offset S of the next virtual gear 8, relative to that of the current virtual gear 8. In other words, the offset S of next gears will simply be the offset S of the previous gear 8 in addition to that between the previous gear and the gear 8 intended to be engaged.

In some non-limiting cases, in accordance with what has been mentioned previously, the predefined offset S changes between virtual gears 8, in particular the predefined offset S respectively increases or decreases as the virtual gears 8 increase. In other words, in the case of a proportional offset S, there will be an increase in the value of the same, while in the case of an inversely proportional offset S (for example in the case of a reduction ratio), there will be a reduction of the same as the virtual gears 8 increase.

Preferably but not in a limiting manner, the difference between the real metric and the respective virtual metric, in particular the offset S, changes, in particular respectively increases or decreases, in steps (i.e. discontinuously) as the virtual gears 8 increase. In detail, the amplitude of the steps increases as the virtual gears 8 increase. In other words, as the virtual gears 8 increase, in at least one gear shift the virtual revolutions per minute will decrease more than the previous gear shift. As a result, it is made possible to simulate a condition of increasingly longer and less limited gears.

According to further non-limiting and not shown embodiments, the predefined values PV, i.e. the positions of the angular points P are empirically established on the real metric RM. In other words, the torque T is cut off by the control unit 12 at predefined RPM of the electric motor 5 of the real (single) gear of the latter. In particular, therefore, the RPM achievable as a function of the virtual gear 8 set by the driver DR are limited.

By way of example, a first value PV could be set at 5000 RPM, while a second one at 8000 RPM and a third one at 12000 RPM. In this way, the driver DR will be able to reach 5000 RPM with the first virtual gear 8, but it will be necessary to shift virtual gear 8 by shifting into the second gear (thanks to the right paddle 16) to increase the velocity Vx until it reaches 8000 RPM. Similarly, at this point the torque T will be cut off by the control unit 12 and it will be necessary to shift gear 8 by shifting into the third gear to reach 12000 RPM, and so on.

Advantageously but not necessarily, whenever the driver DR operates the interface device 7 to determine the shift from one gear to the next one, once the angle point P of the torque profile of that gear 8 has been overcome, the control unit 12 delivers a torque peak to the wheels 2 to reproduce the effect of a mechanical gear shift.

According to some non-limiting and not shown embodiments, the method also provides for an adjustment step, in which the driver DR sets the position of the angular points P, i.e. the predefined values PV.

In use, therefore, the driver DR shifts the virtual gears 8 at will, by moving at his or her discretion the torque T limit profiles A, B, C, D, E, F (therefore of the longitudinal acceleration) with respect to the longitudinal velocity Vx and thus varying the percentage of delivery of the torque to the drive wheels 2 by the power train system 4. In particular, gear shifting takes place by means of the interface system 7, for example the paddles 16 and 17.

Although the above-described invention makes particular reference to a very precise embodiment, it shall not be deemed as limited to that embodiment, since all those variations, modifications or simplifications covered by the appended Claims, such as a different type of electric motorization, a different type of interface system 7, a different number of virtual gears, etc., fall within its scope.

The apparatuses, the machine and the method described above entail numerous advantages.

First of all, the present invention provides for limiting the torque that can be delivered suddenly at the angular points P, so as to make this lack of power easily perceptible to the driver DR, who can readily recover acceleration/torque by shifting gears (up-shift).

In addition, the present invention allows the driver DR to personally influence the torque delivered by the electric power train system in order to obtain a more involving driving mode that can be better associated with the feeling required by the pilot at a determined instant or for a determined curve. In this way it is also possible to involve the pilot more with respect to the possible action of an automatic electronic control system.

A further advantage of the present invention lies in increasing the driving pleasure, precisely by virtue of the fact that it appears to be more customizable and that the sprint given by the gear shifting is again achieved.

In addition, the present invention makes it possible to avoid the use of traction control, leaving the management of excessive torque to the discretion of the driver, who can always up- or down-lift to manage it, so as not to entirely delegate the performance to an electronic control system.

Finally, the control method described above is simple and inexpensive to implement in a road vehicle 1, as it does not require the addition of any physical components and can be completely realised via software by exploiting the architectures already normally present on board the road vehicle 1.

It is important to note that the method described above does not involve a high computing capacity, nor an extensive amount of memory and therefore its implementation is possible in a known control unit without the need for updates or upgrades.

LIST OF REFERENCE NUMBERS OF THE FIGURES

1 vehicle
2 wheels
3 passenger compartment
4 power train system
5 electric motor
6 dashboard
7 interface system
8 virtual gears
10 accelerator pedal
11 brake pedal
12 control unit
13 first drive device
14 second drive device
15 steering wheel
16 right paddle
17 left paddle
18 gear shift control assembly
19 vehicular screen
A limit profile
B limit profile
C limit profile
D limit profile
DR driver
E limit profile
F limit profile
G selected virtual gear
P angular point
PG passenger
PV predefined values
RM real metric
RPM speed metric
S offset
T torque
U users
VM virtual metric
W central steering axis
X axis
Y axis
Z axis

The invention claimed is:

1. A control method for an electric road vehicle (1) comprising an electric power train system (4) and not comprising a mechanical gear/speed change mechanism along the transmission and configured to deliver, by means of at least one electric motor (5), drive torque to at least two wheels (2) of the road vehicle (1);

the method comprising the steps of:

defining a plurality of virtual gears (8), each of which determines a respective limit profile (A, B, C, D, E) of drive torque (T) deliverable by the power train system (4) to the wheels (2) as the velocity varies;

detecting, upon actuation of an interface system (6) by the driver (DR), while driving, a selection for one of the virtual gears (8) currently set by the driver (DR); and delivering a drive torque (T) to at least two wheels (2) according to the selection;

the method being characterised in that at least one limit profile (A, B, C, D, E) of the plurality of virtual gear (8) profiles comprises an angular point (P) at which, as the velocity of the road vehicle (1) increases, the drive torque (T) delivered to the wheels (2) is at least partially cut off; the method further comprising:

defining a virtual metric (VM), in particular virtual revolutions per minute, of the speed of the at least one electric motor (5);

wherein the position of each angular point (P) on each respective profile (A, B, C, D, E) depends on the value of the virtual metric (VM); and wherein the relative positions of the angular points (P) are defined according to a fixed line having a predetermined slope that increases or decreases in the virtual metric (VM) as the virtual gears (8) increase.

2. Method according to claim 1, wherein each respective angular point (P) is arranged, on the respective said profile (A, B, C, D, E), at predefined values (PV) of a speed metric (RPM) of the at least one electric motor (5), in particular at predefined values (PV) of revolutions per minute;

in particular, each angular point (P) determines a virtual torque limiter per RPM of the electric motor (5);

in particular, the method comprises the further step of generating a sound audible by the driver (DR) as a function of at least one limit profile (A, B, C, D, E), more in particular at each angular point (P).

3. Method according to claim 2, wherein the distance between at least two successive predefined values (PV) increases as the virtual gears (8) increase.

4. Method according to claim 1, and comprising the further step of defining a virtual metric (VM), in particular virtual revolutions per minute, of the speed of the at least one electric motor (5); wherein the position of each angular point (P) on the respective profile (A, B, C, D, E) depends on the value of the virtual metric (VM).

5. Method according to claim 4, wherein the virtual metric (VM) corresponds to a respective real metric (RM) of the at least one electric motor (5); in particular wherein virtual revolutions per minute correspond to real revolutions per minute of the at least one electric motor (5); wherein in order to reach a higher real number of revolutions, the driver is forced to change virtual gears.

6. Method according to claim 4, wherein the virtual metric (VM) differs at least in part from a respective real metric (RM) of the at least one electric motor (5); in particular wherein virtual revolutions per minute differ at least in part from real revolutions per minute of the at least one electric motor (5).

7. Method according to claim 6 and comprising a step of projecting on a vehicular screen (19) the virtual metric (VM) and not the respective real metric (RM).

8. Method according to claim 6, wherein the virtual metric (VM) varies in concordance with the respective real metric (RM) apart a predefined offset (S) for each virtual gear (8).

9. Method according to claim 8, wherein the predefined offset (S) changes between virtual gears (8), in particular wherein the predefined offset (S) respectively increases or decreases as the virtual gears (8) increase.

10. A method according to claim 9, wherein the difference between the real metric (RM) and the respective virtual metric (VM), in particular the predefined offset (S), changes, in particular respectively increases or decreases, in steps as the virtual gears (8) increase, wherein the amplitude of the steps increases as the virtual gears (8) increase.

11. Method according to claim 8, wherein, at each angular point (P), the value of the virtual metric (VM) decreases by the additional value of the respective offset (S) of the next virtual gear (8), relative to that of the current virtual gear (8).

12. Road vehicle (1) comprising:

four wheels (2), of which at least two are drive wheels (2);

an electric power train system (4) configured to provide drive torque (T) to at least two drive wheels (2)

an interface system (6) configured to allow the driver (DR) to select a virtual gear (8) from a plurality of virtual gears (8);

in which the virtual gears (8) each determine a torque (T) limit profile (A, B, C, D, E) that can be delivered by the power train system (4) to the wheels (2) as the velocity varies;

a control unit, configured to detect an actuation of the interface system (6) by the driver (DR), while driving, the virtual gear selection (8) and to control the delivery of the drive torque (T) to the at least two drive wheels (2) as a function of said selection;

the control unit being configured to command, as the velocity of the road vehicle (1) increases, at at least one angular point (P) of one of the profile profiles (A, B, C, D, E) of the plurality of virtual gears (8), a cut in the torque (T) delivered to the wheels (2);

wherein a position of each angular point (P) on each respective profile (A, B, C, D, E) depends on the value of a virtual metric (VM); and wherein the relative positions of the angular points (P) are defined according to a fixed line having a predetermined slope that increases or decreases in the virtual metric (VM) as the virtual gears (8) increase.

13. Vehicle (1) according to claim 12, wherein the control unit is configured to perform the method according to claim 1.

14. Vehicle (1) according to claim 12, wherein the interface system (6) comprises at least one first device (13) operable by the driver (DR) with the right hand and at least one second device (14) operable by the driver (DR) with the left hand;

wherein one between the first drive device (13) and the second drive device (14) is configured to allow the driver (DR) to shift to the higher virtual gear (8) and the other between the first drive device (13) and the second drive device (14) is configured to allow the driver (DR) to shift to the lower virtual gear (8).

15. Vehicle (1) according to claim 14 and comprising a steering (15), wherein the steering is rotatable about a central steering axis, wherein the first device (13) and the second device (14) are paddles arranged respectively to the right and to the left of the central steering axis, preferably symmetrically, in particular so as to face each other and extend radially from said central steering axis (W).

* * * * *